(12) United States Patent
Ferrando

(10) Patent No.: US 7,070,882 B1
(45) Date of Patent: Jul. 4, 2006

(54) REACTIVE METAL HYDROGEL/INERT POLYMER COMPOSITE ANODE AND PRIMARY METAL-AIR BATTERY

(75) Inventor: William A. Ferrando, Arlington, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 436 days.

(21) Appl. No.: 10/298,516

(22) Filed: Nov. 19, 2002

(51) Int. Cl.
*H01M 4/58* (2006.01)

(52) U.S. Cl. .................. 429/218.1; 429/245; 429/217; 429/206; 427/123; 427/58; 427/126.1; 252/182.1; 264/104

(58) Field of Classification Search ............. 429/218.1, 429/245, 231.6, 217; 427/123, 58, 126.1; 252/182.1; 264/104
See application file for complete search history.

(56) References Cited

U.S. PATENT DOCUMENTS

| 4,797,190 A | | 1/1989 | Peck |
| 4,915,985 A | * | 4/1990 | Maxfield et al. ............ 264/104 |
| 5,283,138 A | | 2/1994 | Ferrando |
| 6,584,349 B1 | * | 6/2003 | Sage ........................... 604/20 |

* cited by examiner

*Primary Examiner*—Laura Weiner
(74) *Attorney, Agent, or Firm*—Jane Barrow

(57) ABSTRACT

An anode for use in a primary metal-air battery having an alkaline or neutral salt electrolyte, the anode comprising: a low molecular weight reactive metal substrate; a low molecular weight reactive metal powder; and at least a two-component electrolyte resistant polymer system; the first component is an ionic conductive linearized hydrogel, the second component is an inert structural polymer matrix, the reactive metal powder is dispersed and the first component is uniformly dispersed within the second component to form a material, and the reactive metal is selected from the group consisting of magnesium, aluminum, tin, mixtures of aluminum, tin and magnesium and alloys thereof.

11 Claims, 8 Drawing Sheets

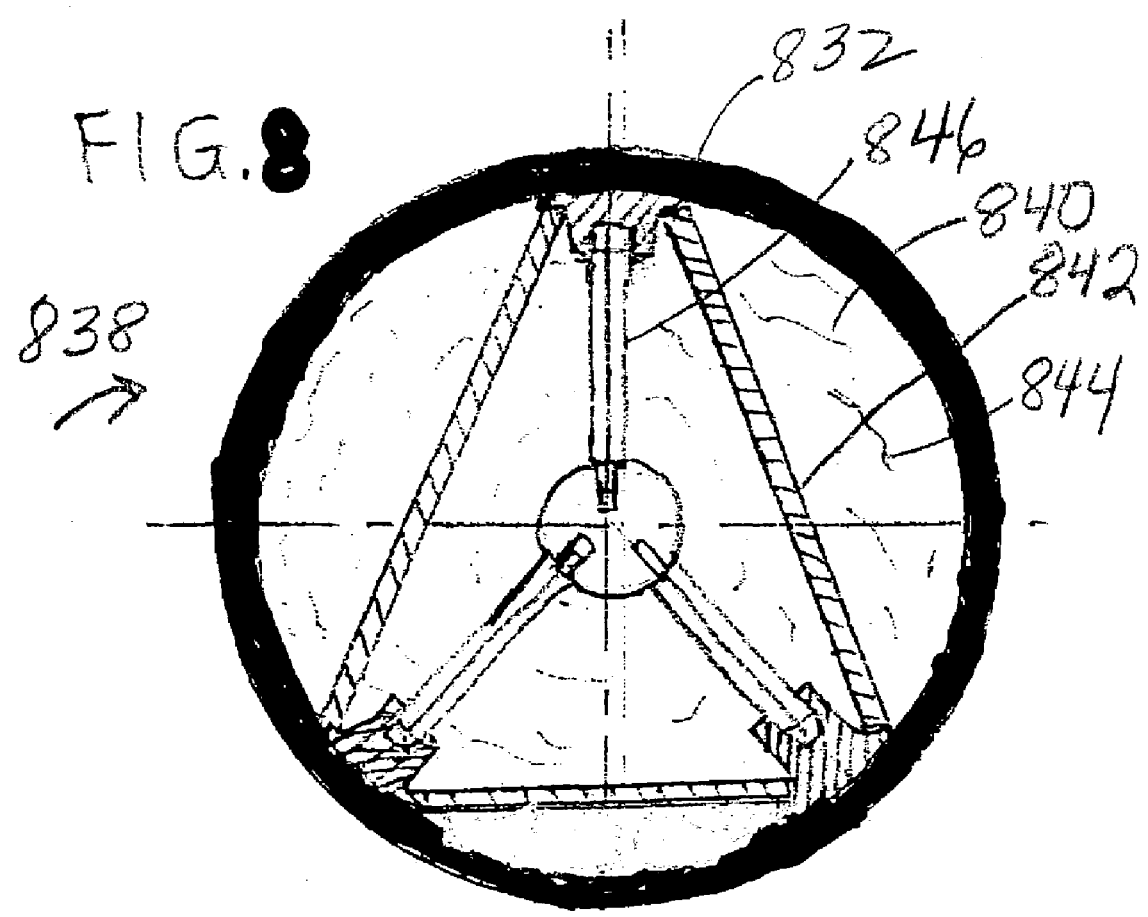

REACTIVE METAL HYDROGEL/INERT POLYMER COMPOSITE ANODE AND PRIMARY METAL-AIR BATTERY

BACKGROUND OF THE INVENTION

1. Field of the Invention

This invention relates to an anode component for primary, mechanically rechargeable metal-air batteries and, more particularly, to a reactive metal anode protected from corrosion by a hydrogel/inert polymer matrix, a method of manufacturing a reactive metal anode, a primary metal-air battery containing a reactive metal anode, and lightweight portable primary battery components that can be assembled in situ.

2. Description of the Prior Art

Batteries having a metal anode and gas-diffusion cathode are generally known as metal-air batteries. Metal-air batteries have a high energy and power density, a flat discharge voltage, long storage life and use oxygen as the cathode. Air as the source of oxygen is inexhaustible. A metal-air battery can be used in field situations for portable radios, computers and/or the like.

During operation of this type of battery, oxygen from ambient air is electrochemically converted at a cathode to hydroxide anions and a metal anode is oxidized to metal cations. A suitable electrolyte, such as, an aqueous solution of an alkali or a neutral salt, KOH/NaOH and NaCl/KCl, respectively, electrochemically couples the anode and cathode to produce an electrical potential such that a current can flow to an external electrical load.

During the electrochemical reaction, a reactive metal anode, e.g., an aluminum anode, in each cell is consumed and oxygen from the atmospheric air is catalytically reduced and combined with water from the electrolyte forming hydroxyl ($OH^-$) ions. Water is depleted via chemical reaction and the molar content of the electrolyte changes. The reactive metal anode can be reduced in thickness as it gives up its stored energy. In addition, the reactive metal anode can dissolve in the electrolyte. If the anode constitutes the only means for carrying current, the conductive capacity of the cell decreases over time as the anode is consumed. After the anode is expended to the point where it must be replaced, the cell must be refueled with a new anode and fresh electrolyte.

The prior art field batteries were usually a Li/thionyl chloride battery. They have an energy capacity in the range of 250–500 watt-hrs/kg. These batteries cannot be safely disposed in the environment and can pose an explosion hazard under certain conditions. In addition, these batteries are expensive and heavy.

Aluminum as the reactive metal would be desirable as an anode in a primary metal-air battery as it has high ampere-hour capacity, voltage, and specific energy and density. Aluminum is also inexpensive, abundant and lightweight. The major problem in using aluminum as the anode is the corrosion that eventually results in the destruction of the anode. It would be desirable to prevent the corrosion and thus slow the destruction of the anode. It would also be desirable to be able to immediately replace the anode, i.e., mechanically recharge the anode, once destroyed with another anode that is lightweight, portable and can continue to provide high power and energy density in the field. It would be desirable to use an alkaline electrolyte as it has higher conductivity than a neutral salt electrolyte and if the anode were aluminum, $Al(OH)_3$ would dissolve in the alkaline electrolyte. Although it might also be desirable to use a neutral electrolyte as it is not corrosive to an aluminum anode and has fewer hazards. It would be desirable to have a lightweight, long lasting, portable, environmentally friendly, inexpensive aluminum anode component for insertion into a lightweight, portable, environmentally friendly, primary metal-air battery for immediate use as a source of high power to thereby prevent the loss of deliverable capacity and operational time. It would be desirable to be able to provide a lightweight, portable, environmentally friendly group of components for assembling a metal-air battery in situ when needed, e.g., for use in portable radios and computers in the field. Finally, it would be desirable to be able to clean out the electrolyte chamber of any dissolved or undissolved reaction products using locally available water.

OBJECTS OF THE INVENTION

Accordingly, one of the objects of the present invention is to provide an anode, e.g., an aluminum anode, in which the anode is electrolyte resistant.

Another object of the present invention is to provide a method of manufacturing a reactive metal anode.

A further object of the present invention is to provide a reactive metal anode that can be inserted into a lightweight portable metal-air battery when needed.

A still further object of the present invention is to provide a lightweight portable anode for use in a lightweight portable metal-air battery.

A yet still further object of the present invention is to provide a composite anode that is ion conducting.

An even further object of the present invention is to provide an anode that is accessible for an electrochemical reaction to take place.

An even yet further object of the present invention is to provide a battery in which the electrolyte compartment can be easily cleaned of any dissolve and/or undissolved reaction products in the field.

An even yet still further object of the present invention is to provide lightweight portable components for assembly into a battery in situ when needed.

SUMMARY OF THE INVENTION

These and other objects of the invention are achieved in preferred articles and method of manufacture of the invention by providing an anode for use in a primary metal-air battery having an alkaline or neutral salt electrolyte. The anode includes a low molecular weight reactive metal substrate; a low molecular weight reactive metal powder; and at least a two-component electrolyte resistant polymer system. The first component is an ionic conductive linearized hydrogel, and the second component is an inert structural polymer matrix. The reactive metal powder is dispersed and the first component is uniformly dispersed within the second component to form a material. The material coats the substrate. The reactive metal is selected from the group consisting of magnesium, aluminum, tin, mixtures of aluminum, tin and magnesium and alloys thereof.

In addition, a primary battery anode can be used in a primary metal-air battery having an alkaline or neutral salt electrolyte. The anode includes aluminum and/or an aluminum alloy substrate; aluminum and/or an aluminum alloy powder; linearized polyacrylic acid; and polystyrene or polymethyl methacrylate. The powder is dispersed and the polyacrylic acid is uniformly dispersed within the polystyrene or polymethyl methacrylate to form a material. The material coats the substrate.

The method of manufacturing the primary metal-air battery anode having an electrolyte includes the steps of: working polyacrylic acid hydrogel into a low molecular weight alcohol; linearizing said polyacrylic acid hydrogel to form a gel; dissolving polystyrene or polymethyl methacrylate in a solvent to form a polymer solution; adding the polymer solution to the gel with agitation to form a mixture; adding aluminum or aluminum alloy powder to the mixture to form a solvated polymer solution so that the hydrogel is uniformly dispersed within the polymer solution; mixing the solvated polymer solution; applying the mixed solvated polymer solution onto an aluminum or aluminum alloy substrate; drying; hot pressing; and forming an anode comprising a material of the aluminum powder, hydrogel and polystyrene or polymethyl methacrylate that coats the substrate. The solvent is compatible with the gel.

A primary metal-air battery containing a lightweight, portable, environmentally friendly aluminum hydrogel/inert nonporous polymer anode includes: an air cathode; KOH or NaOH or NaCl or KCl electrolyte; and an aluminum composite anode. The anode composite comprises: aluminum or aluminum alloy substrate; aluminum or aluminum alloy powder; and at least a two-component electrolyte resistant polymer system. The first component is an ion conducting linearized hydrogel comprising polyacrylic acid. The second component is an inert structural polymer matrix comprising polystyrene or polymethyl methacrylate. The aluminum or aluminum alloy powder is dispersed and the first component is uniformly dispersed within the second component to form a material. The material coats the aluminum or aluminum alloy substrate to form an aluminum anode composite.

Lightweight, portable components are assembled to make a primary metal-air battery. The components are: a monoblock case having one or more air cathodes and one or more cells within said case for at least one anode composite, an electrolyte and water; an aluminum or aluminum alloy composite anode; alkaline or neutral salt particles; water; and a cover for maintaining the components within the case. The anode composite comprises an aluminum or aluminum alloy substrate, an aluminum or aluminum alloy powder dispersed within an inert structural polymer and a linearized hydrogel uniformly dispersed within the inert structural polymer to form a material. The material coats the substrate of aluminum or aluminum alloy.

BRIEF DESCRIPTION OF THE DRAWINGS

These and other objects, features and advantages of the invention, as well as the invention itself, will become better understood by reference to the following detailed description when considered in connection with the accompanying drawings, wherein like reference numerals designate identical or corresponding parts throughout the several views, and wherein:

FIG. 8 is a top sectional view along line 8—8 of a metal-air battery containing three cells.

DETAILED DESCRIPTION OF THE PREFERRED EMBODIMENT

Figure 1:
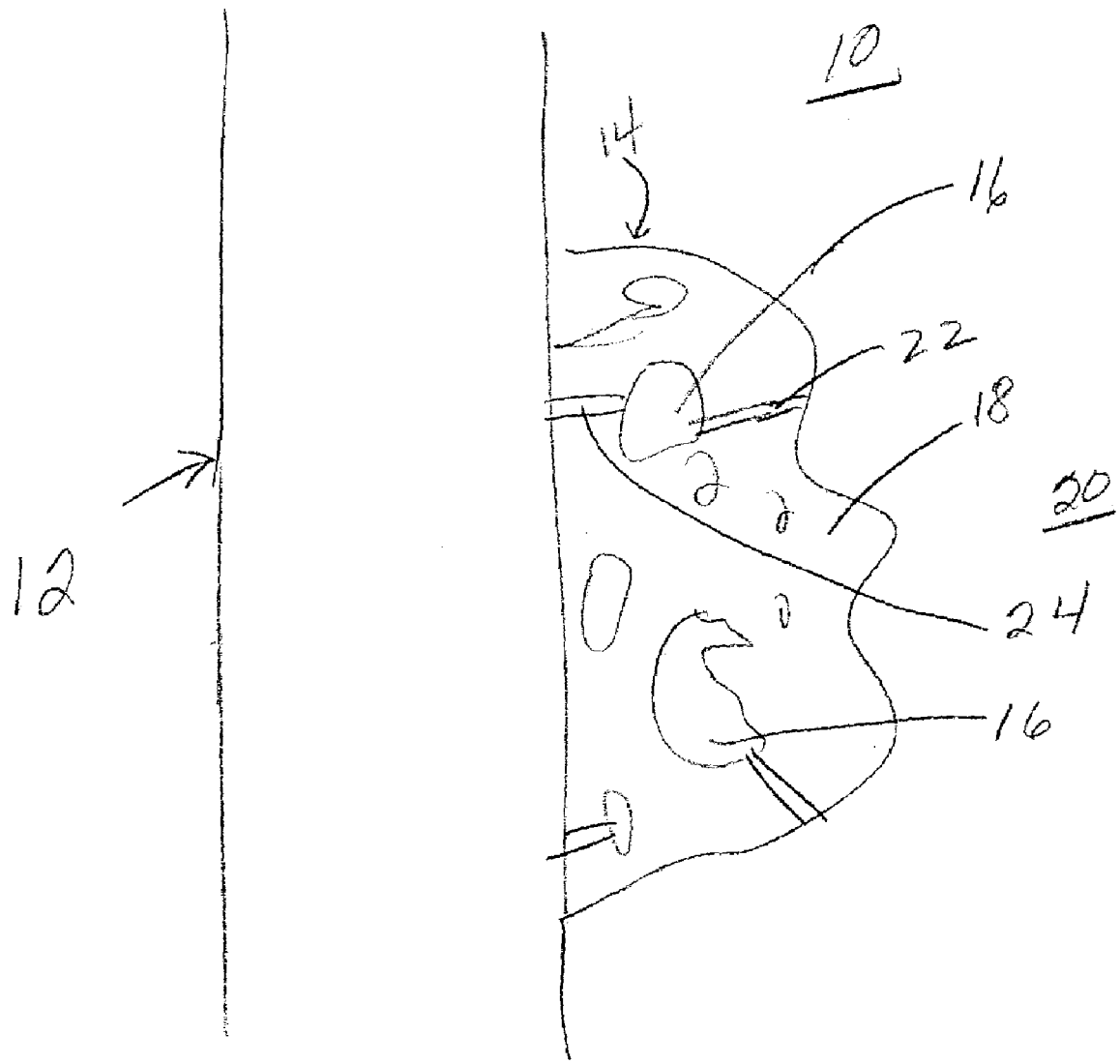
FIG. 1 is a schematic drawing illustrating the relationship between the components of the reactive metal anode of this invention.
Figure 2:
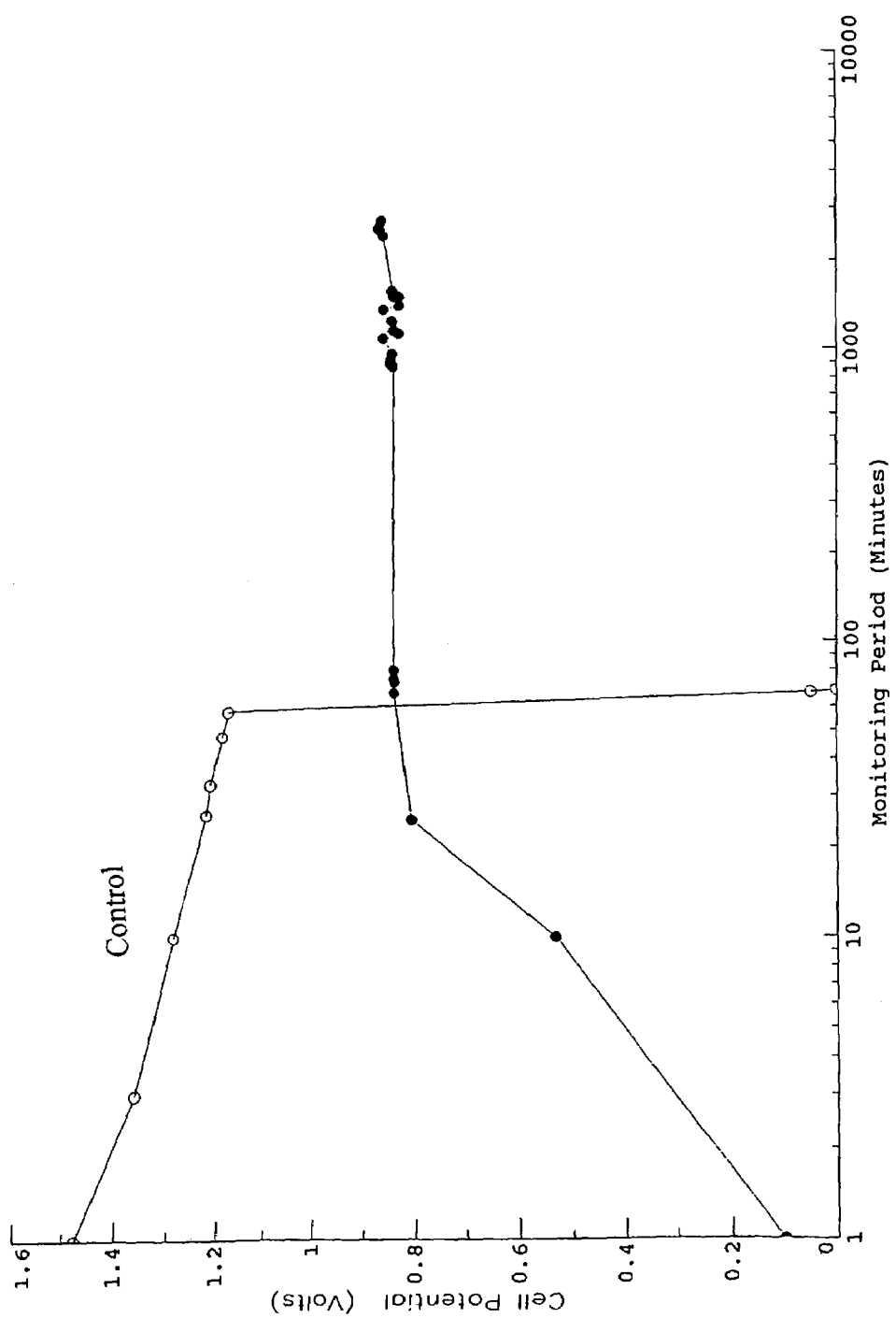
FIG. 2 is a graph comparing cell potential vs. monitoring times for Example 4.
Figure 3:
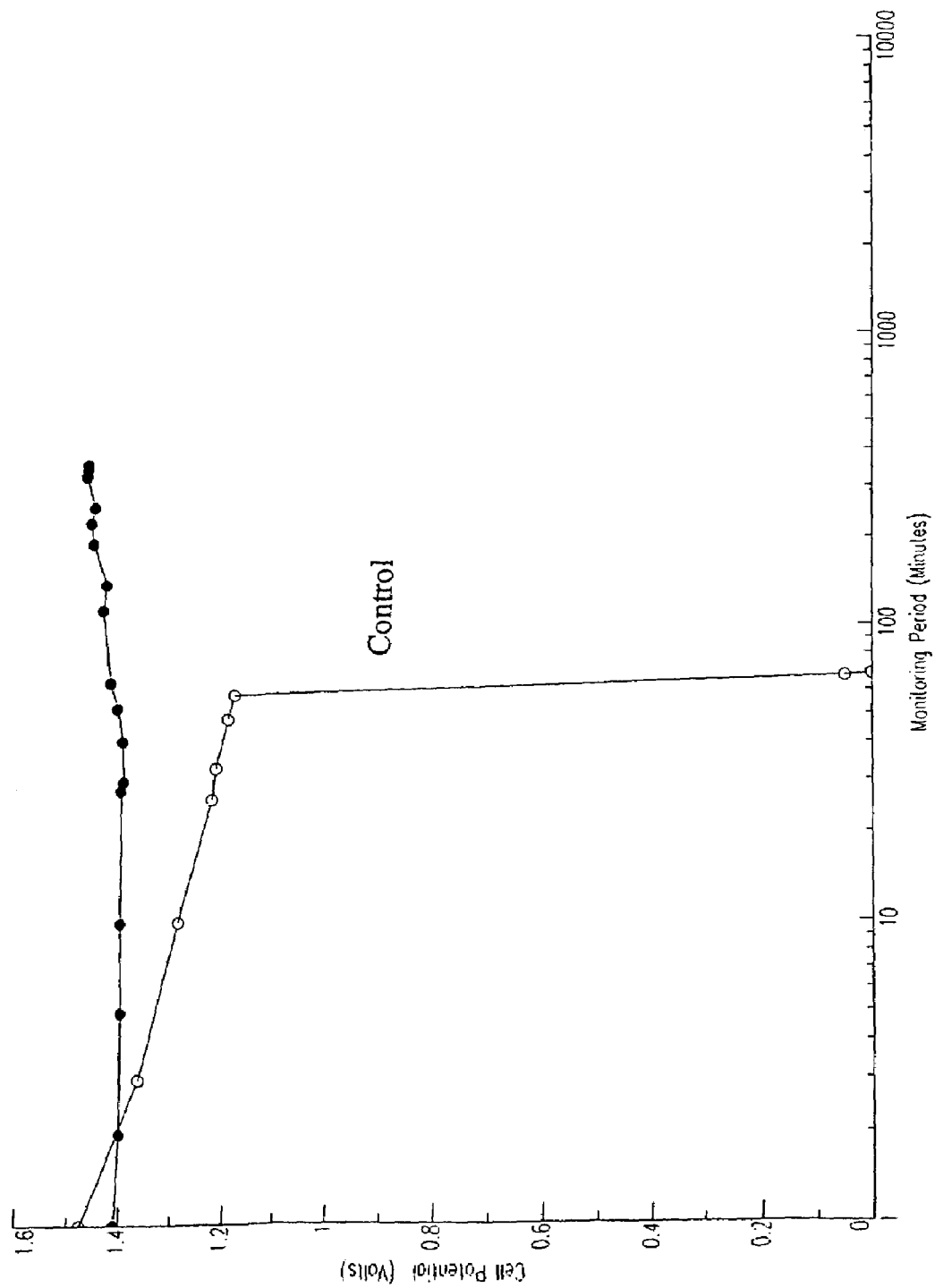
FIG. 3 is a graph comparing cell potential vs. monitoring times for Example 5.

Referring now to the drawings, a reactive metal anode component, a method of making a reactive metal anode component, a battery containing the reactive metal anode component, and lightweight portable components for assembly into a lightweight portable primary battery involve the following steps:

In a portable, high energy density primary mechanically rechargeable metal-air battery, the anode of the present invention comprises a material that completely coats reactive metal fibers of a reactive metal foil or mesh, grid, a substrate. The components of the material are a reactive metal powder and a two-component electrolyte resistant ion conducting polymer system that reduces corrosion from a corrosive electrolyte thereby extending the real time use of the anode. The reactive metal powder and a hydrogel (one of the components of the polymer system) are dispersed within an inert structural polymer matrix (the other component of the polymer system) and then applied to a substrate to form a film.

The hydrogel consists of long polymeric chains containing active groups that allow for the transport of ions through the material by functioning as an ionic semiconductor. The hydrogel is selected from the group consisting of synthesized and man-made long chain polymeric hydrogels. The synthesized hydrogel is selected from the group consisting of polyethylene oxide, polyacrylic acid (PAA), polyacrylamide, and mixtures thereof, preferably, polyacrylic acid, PAA. A natural hydrogel is selected from the group consisting of hydroethyl cellulose, gelatin, pectin, cellulose and starch. The hydrogel used was: Carbopol® 678 (having a molecular weight of 720,000), 679 (molecular weight of 320,000), 980 (molecular weight of 2.3–4,000,000) purchased from BFGoodrich Company, Inc., Specialty Polymers and Chemical Div., Cleveland, Ohio, presently owned by Noveon, Inc., Cleveland, Ohio, and a 25% solution of PAA, having a molecular weight of 90,000 purchased from FisherChemical. "Carbopol" is a registered trademark. Usually, two or more of the hydrogels were mixed, i.e., high and low molecular weights, e.g., 0.5 g of Carbopol® 678 and 0.5 g of 25% solution of PAA from FisherChemical having a molecular weight of 90,000.

The hydrogel comes in numerous molecular weights. Various molecular weights between 90,000 to 4,000,000 of the long chain dry polymer are mixed into a low molecular weight alcohol. A molecular weight of 720,000 provides for a fully extended chain length of 0.1 mm. Each particle of the hydrogel is a molecule and is most likely in a folded polymer structure when purchased. After the polymer is thoroughly mixed with an alcohol solvent, e.g., methanol, neutralization with a salt solution, e.g., ammonium hydroxide, separates and linearizes the polymer. The hydrogel molecules have a high hydrophilicity. When the molecules of the hydrogel are linearized, active groups become available along the chain for ion "hopping", i.e., ion conduction.

Not wanting to be held to a theory as to the behavior of the hydrogel, it is believed that the hydrogel has charged groups available along the polymer chain, i.e. projecting outward from the backbone of polymer, thereby allowing for the hydrogel chains to provide a mechanism for ion conduction. The ion transfer process is believed to require both the availability of ions on one side of the membrane to removal of the ions on the other side of the membrane. The inner charge transfer of the membrane is coupled with the external ionic electrochemical depletion gradient and therefore to the electrode reactions in an electrochemical cell. Selectivity of the membrane, i.e., the preferred ion transfer, thus appears not to be determined so much by the membrane characteristics, but by the electrode/electrolyte reactions or surface ionic variations. Ion transport along the hydrogel is described as "hopping" from one group to another group or from donor site to an acceptor site. The process of ion transport involves a transfer of energy from an acceptor site. The energy for such transfers is supplied by thermal energy, which is demonstrated by high temperature coefficients or activation energy. The inner charge transfer is coupled with the external ionic electrochemical depletion gradient and therefore to the electrode reactions in an electrochemical cell. The ion which is transferred through the membrane may not be the ion oxidized or reduced at the electrode since the ion reaction at the electrode may in turn react with or be the result of another reaction in the electrolyte which in turn causes the increase or decrease in the activity or concentration of another ion at the surface of the membrane. A lot of this theory is found in U.S. Pat. No. 4,797,190, which is titled "Ionic Semiconductor Materials and Applications Thereof" to Robert L. Peck and is herein incorporated by reference in its entirely.

The dry hydrogel has a weight % of from about 1.0 wt % to about 45 wt %, preferably between 4–6% of the material. The material comprises the two-component electrolyte polymer system and the metal powder. It does not include the weight of said reactive metal foil or mesh, grid, substrate.

The polymer matrix/structural component is inert to the electrolyte. It is a non-porous, non-permeable polymer that is selected from the group consisting of polyvinylidene chloride, polyvinyl chloride, polyvinylidene fluoride, polyethylene, polypropylene, urethane, polystyrene, polymethyl methacrylate, phenol formaldehyde and mixtures thereof, preferably, polystyrene and polymethyl methacrylate (e.g., LUCITE®). Compatible copolymers such as polyethylene/polypropylene may also be used. The hydrogel is dispersed within the inert structural polymer matrix, i.e., the hydrogel is uniformly dispersed throughout the matrix, to form a two-component electrolyte resistant polymer system. One could visualize the hydrogel dispersed within the inert polymer matrix as threads of yarn through a ball with the ion groups projecting outward of the thread chains into the ball like fuzz and thus being freely available for ion transport from the electrolyte to the reactive metal powder. Sufficient bonding between the hydrogel and the matrix is required to prevent leaching of the hydrogel and also to provide a material that is inert to the environment. The inert structural component/matrix has a weight % of from about 3.5 wt % to about 75 wt %, preferably between 4–6%, of the material.

The anode contains a low molecular weight reactive metal powder generally of high purity of one or more mesh sizes, e.g., −325 mesh (20–25 microns). The reactive metal is selected from the group consisting of Al, Mg, Sn, mixtures thereof and alloys thereof, e.g., Al alloy containing Mg and Sn (EB50V). The low molecular weight reactive metal powder has a weight % of from about 15 wt % to about 95.5 wt %, preferably 88–92%, of the material. The reactive metal powder provides for electron conduction throughout the material.

The anode also contains a reactive metal substrate, consisting of layer(s) of expanded metal grid (mesh) or pierced foil(s) that act as both a support for the composite and a current conductor. The material coats sintered or unsintered fibers of the reactive metal grid, the substrate. The substrate as a grid or mesh can be a perforated aluminum sheet or an expanded metal mesh or multiple sheets. The composite comprises (the two-component electrolyte resistant polymer system and the powdered reactive metal) the material and the reactive metal substrate.

It is believed that the anode operates by conducting the exchange of electrons through the electron conduction portion of the composite and the exchange of ions through using the active groups along the backbone of the polymer chains of the hydrogel.

FIG. 1 is a schematic drawing illustrating a portion of one material coated fiber from a substrate as used in the present invention. The material coated fiber, substrate, 10 is made of a low molecular weight reactive metal having openings that provide fibers which are coated with the material, e.g., Al alloy fiber and a material consisting of the reactive metal powder/hydrogel/inert structural polymer matrix. Surrounding and attached to each fiber 12 is the reactive metal/hydrogel/inert polymer matrix material 14. The material comprises reactive metal powder 16, hydrogel and inert polymer matrix 18. Electrolyte 20 surrounds the matrix. It is desirable to completely coat the mesh/foil, grid, substrate, in order to prevent the electrolyte 20 from dissolving the anode of both reactive metal grid or mesh or foil and powder. Throughout the polymer matrix there is found what is described as channels 22 and 24. First, water from the electrolyte passes into the material to the hydrogel through the channels 22. Second, the hydroxide ions from the electrolyte solution 20 pass through the channels 22, i.e., the linear chains of the hydrogel, which lead from the electrolyte to the active material, by hopping along the chain to eventually combine with the reactive metal cations to form, e.g., $Al(OH)_3$ if the anode were aluminum. The channels 24 allow for the electrons to pass from the reactive metal powder to the substrate, electron current conductor.

There is a uniform distribution and confinement of the hydrogel within the inert polymer matrix. The composite can be formed into sheets or other required geometry.

When a quantity of the long chain hydrogel of one or more molecular weights is incorporated into the inert matrix, a physical barrier can be created between the active species, reactive metal (both substrate and powder), and electrolyte, while maintaining ionic and electronic conduction. The composite separates the anode from the electrolyte and effectively slows the corrosion reaction of the reactive metal, e.g., aluminum alloy or aluminum powder and substrate are protected from the electrolyte, e.g., NaOH electrolyte.

The method of preparing the material and composite involves maintaining the hydrogel and the matrix, both polymers, in solution. The hydrogel is worked into an alcohol, e.g., methanol, and linearized with e.g., ammonium hydroxide to form a gel. The inert structural polymer matrix, e.g., polystyrene, is dissolved in a solvent, e.g., tetrahydrofuran, that is a solvent compatible with the hydrogel solution. It is desirable to use nontoxic solvents for safety reasons. Once the inert structural polymer matrix dissolves, the mixture is added to the gel with agitation. Getting consistency is difficult and quite desirable, i.e., having uniformity in the distribution of the hydrogel throughout the inert polymer, and not having lumps is critical. If the aluminum as the hydrogel within the hydrogel/polymer matrix is not uniform, the regions with larger quantities of the hydrogel, possibly lumps, will discharge rapidly. The regions devoid of the hydrogel, however, will be essentially insulated and will not discharge at all. This condition will result in an anode with shortened life and low utilization of the reactive metal, e.g., aluminum. The relative proportion of solvent volumes to accomplish this generally will be proportional to the relative weights of the respective polymers. The reactive metal, e.g., fine aluminum powder of one or more mesh sizes, e.g., −325 mesh, is then added to the mixture to form the material. This solvated polymer solution generally must be agitated to maintain the powder in solution. This mixture, the material, is then applied, e.g., dripping, onto the grid fibers and the solvent evaporated to form the composite. The process of infiltrating and drying of this solution on the grid is followed by hot pressing to consolidated and bond the infiltrate to form an anode component. Hot pressing the material into the sintered or unsintered reactive metal grid produces the anode. As a result of this hot pressing procedure, the material surrounds the fibers of the grid. The grid provides electrical conduction paths throughout the material and also provides physical support for the material. It is most desirable that, within this structure, the polymer chains be both linearized and isolated from one another.

An anode component comprises a reactive metal grid with aluminum tabs (which must be protected from premature corrosion by the electrolyte by using appropriate sealing techniques) coated with a material of a reactive metal powder and hydrogel dispersed within an inert structural polymer matrix. The sealant used on the tabs of the substrate was Translucent RTV 108 silicon rubber adhesive sealant purchased from GE.

A battery can contain a number of cells or just one. Each cell contains one compartment of an electrochemical couple (anode and cathode), a separator and an electrolyte. It is contemplated that the battery is be used in the field. Thus, one would want it to be lightweight, portable and hopefully environmentally friendly. In addition, the electrolyte chamber should be suited for cleaning after each anode is removed to remove the dissolved and undissolved reaction products. Water can be used. Because the battery is not rechargeable it is desirable that the battery cannot be activated until needed. Thus, the components of this battery are to be portable, lightweight and can be assembled when power is needed. The metal-air battery is light as an air cathode is light. Aluminum metal is light, inexpensive and available. If water for the electrode can be obtained from the environment then only packets of alkaline or neutral salt particles, possibly as a gel, are needed and can be secured to the anode component. Many anode components can be carried as each is light. When needed the anode component is inserted into a metal-air battery. Water from any available source is added to the battery and finally the alkaline or neutral particles, possibly as a gel, are added and mixed. After the anode is used, it is removed and the electrolyte area cleaned out of any precipated reaction product(s). The anode of the present invention discharges at currents of up to about 20 mA/cm$^2$.

EXAMPLE 1

Test electrodes of one square inch were cut from a lightweight, sintered, nickel fiber substrate of high porosity (~85%) to which were welded nickel tabs. The powder was aluminum along with PAA as the hydrogel and an inert polymer. Initially, 0.7 volts were obtained that leveled off to 0.2 volts with time.

EXAMPLE 2

Test electrodes of one square inch were cut from aluminum expanded metal mesh. These produced a consistently higher cell potential than those of Example 1.

EXAMPLE 3

Pure aluminum powder (−325 mesh, 99.5%) was employed as the active species combined with the moderating polymer blends. Control electrodes of one square inch in area were cut from pure aluminum strips with integral tabs. Weights of the active Al content of each were approximately equal.

Two-component polymer solvent mixtures were made. These consisted of an ionic conductive component, polyacrylic acid (PAA), B. F. Goodrich Company, Inc., Specialty Polymers and Chemicals Div., Cleveland, Ohio 44141, and an inert structural component polymethyl methacrylate (LUCITE®) or polystyrene. 0.1 g of PAA, 0.1 g of either polystyrene or polymethyl methacrylate and 2 g of aluminum powder were used or 4.5% PAA, 4.5% polystyrene or polymethyl methacrylate and 91% aluminum powder.

These two polymers are difficult to maintain together in solution. First, the PAA was worked into a linearized methanol based gel. Then, the inert structural polymer (polymethyl methacrylate, polystyrene, or the like) were dissolved in an appropriate compatible solvent and slowly added to the gel with agitation. Finally, fine aluminum powder was added to the gel, which assumed a thick, but pourable consistency. A process of repeating infiltrating and drying of this solvated polymer solution followed by hot pressing to consolidate and bond the infiltrate fabricated the final anodes.

The open circuits (OCV) cell potentials were monitored with time, see FIGS. 2–6. The results could then be compared to planer control electrode maintained at the same conditions. The set-up consisted of a voltmeter, a silver mesh counter electrode and the electrolyte described above set in a beaker.

EXAMPLE 4

The electrode was fabricated as described above with a polymer mass ratio of 1:1 PAA:polystyrene. A cell potential of about 0.86 volts was sustained for several thousand minutes with the composite anode compared with that of about 1.2 volts for 60 minutes for a planer aluminum control, see FIG. 2. Both the control and the test anode had about the same active mass. The behavior of this test electrode was typical of those with Al substrates. By varying the polymer formulations (1.5:1→0.5:1, PAA:polystyrene), a maximum of about 0.9 volts (OCV) could be attained. Most formulations yielded reduced potentials of several tenths of a volt. It was assumed that the reduction of OCV compared to that of the control results from use of the Ni substrate. A "self-couple" may be formed within the electrode body, thereby reducing its external potential.

EXAMPLE 5

In order to verify whether the base metal was affecting the potential, aluminum expanded metal mesh was obtained for use as a substrate. One-inch wide strips were cut. These were folded over several times to provide a 1 square inch substance with integral tab. The combined aluminum powder and polymer were infiltrated, dried and hot pressed into this substrate.

Improved performance was apparent immediately upon performing the potential monitoring test. The result can be seen in FIG. 3. The open circuit potential of the electrode was monitored for 7 hours and actually showed a slight increase over the period from 1.40 to 1.45 volts. This can be compared with the planar aluminum control whose potential decreased from 1.4 to about 1.2 volts prior to completely dissolving in 1 hour.

EXAMPLE 6

Figure 4:
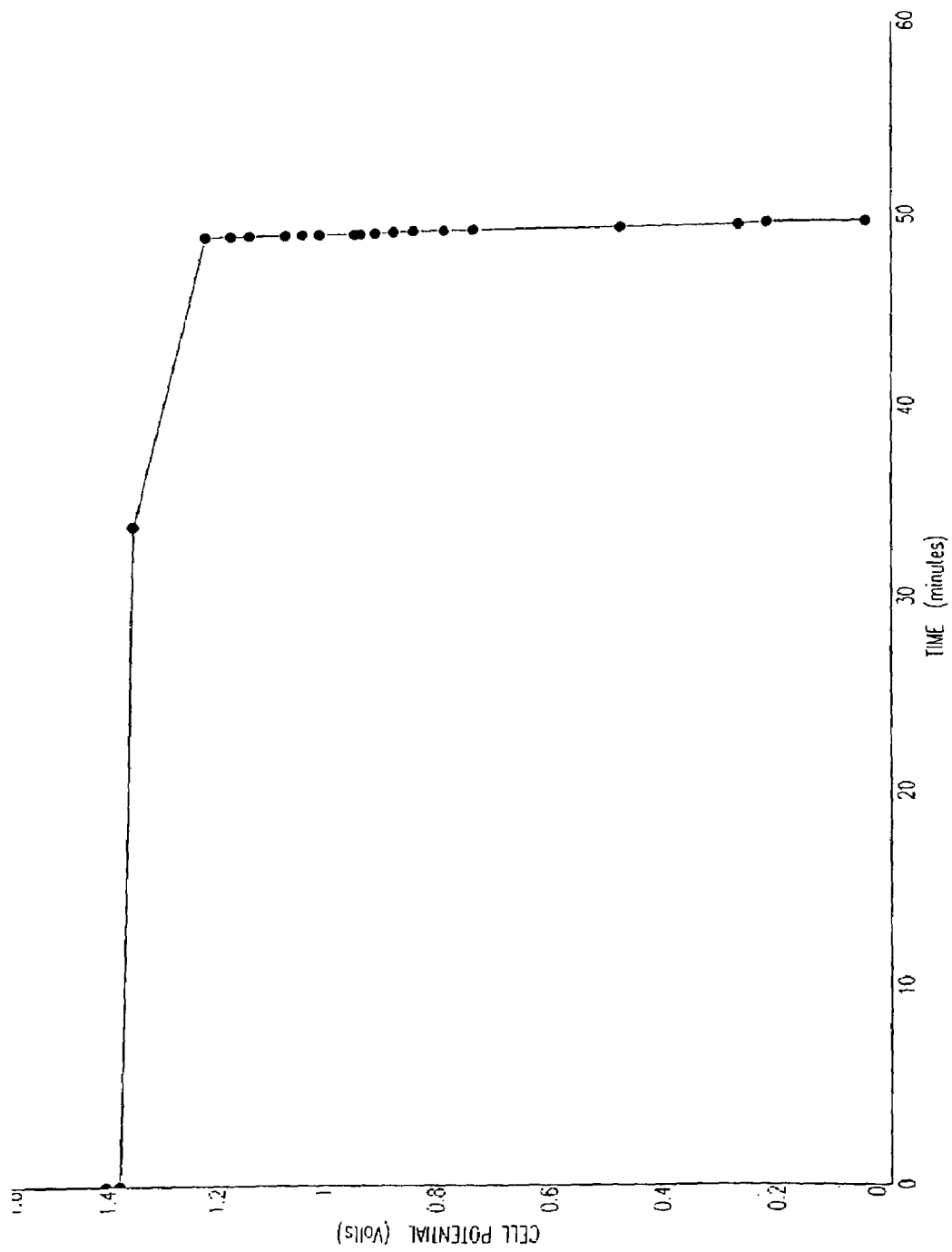
FIG. 4 is a graph comparing cell potential vs. monitoring times for Example 6.

Several additional composite electrodes were fabricated with Al substrates as described above for testing under load. The test cell, electrolyte and set-up have been described above. The electrode contained a polymer weight ratio of 1:1 PAA:polystyrene. It was discharged at 1 mA/cm$^2$. The cell potential profile is shown in FIG. 4. The potential was observed to remain quite constant at about 1.4 volts throughout the 50-minute discharge. The very sharp drop at the end indicated premature tab failure. This apparently occurred despite coating the tab area wetted by electrolyte with the RTV silicone sealer. Tab failure in the Al based electrodes is an important concern as electrolyte contact will dissolve this relatively small portion of metal very rapidly.

EXAMPLE 7

Figure 5:
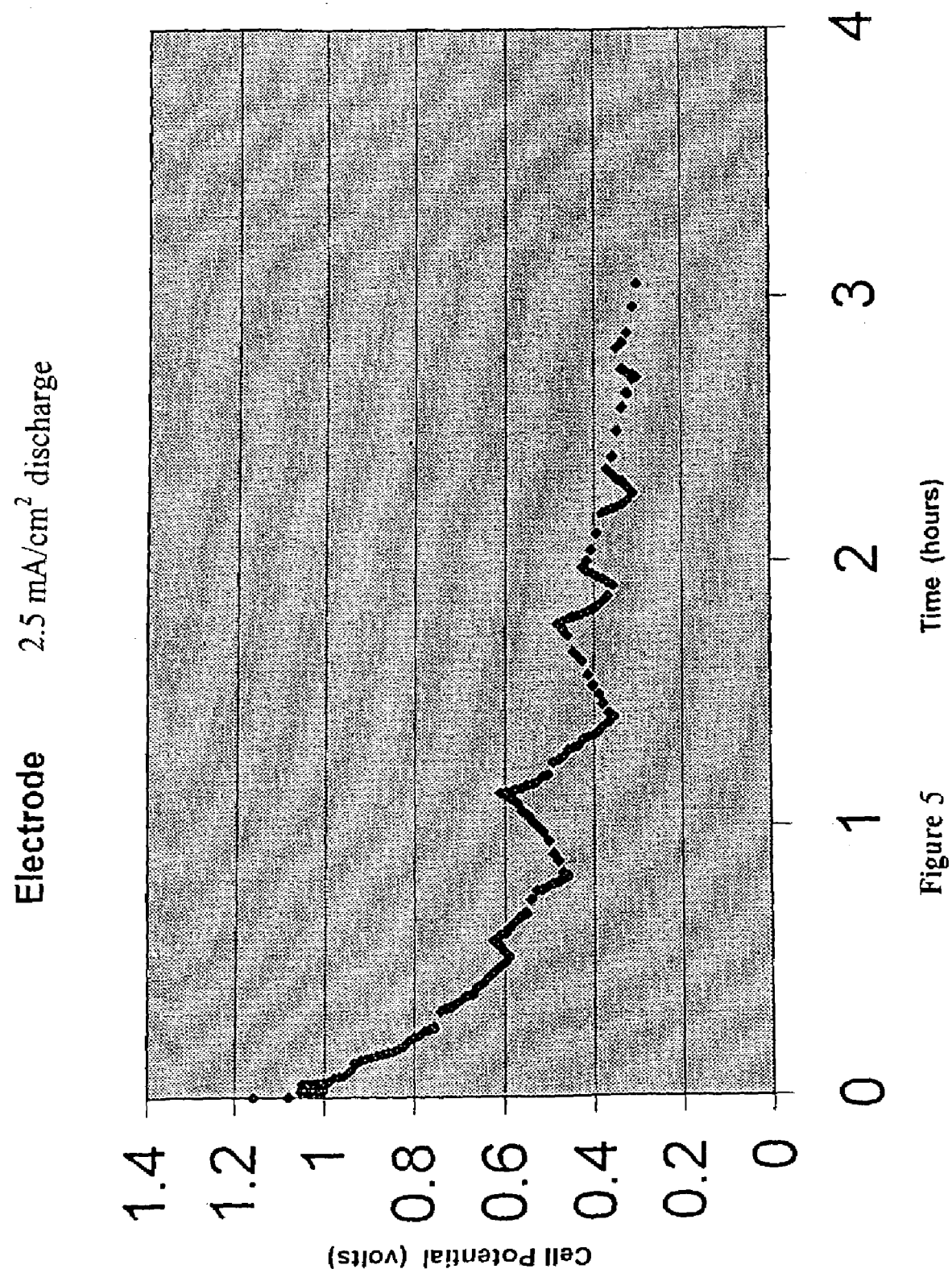
FIG. 5 is a graph comparing cell potential vs. monitoring times for Example 7.

An electrode has been prepared with a polymer ratio of 1:2 PAA:polystyrene. Its tab base was coated carefully with the silicone and the electrolyte to a level just reaching the top edge of the electrode. This was intended to minimize tab corrosion. A discharge current of 2.3 mA/cm$^2$ was applied. The results are shown in FIG. 5. The peculiar undulating profile of the cell potential may be due to electrode's non-uniformity, although, additional testing is necessary to confirm and eliminate the cause. The discharge was sustained for 3 hours, although the potential fell below 0.5 volts.

EXAMPLE 8

Figure 6:
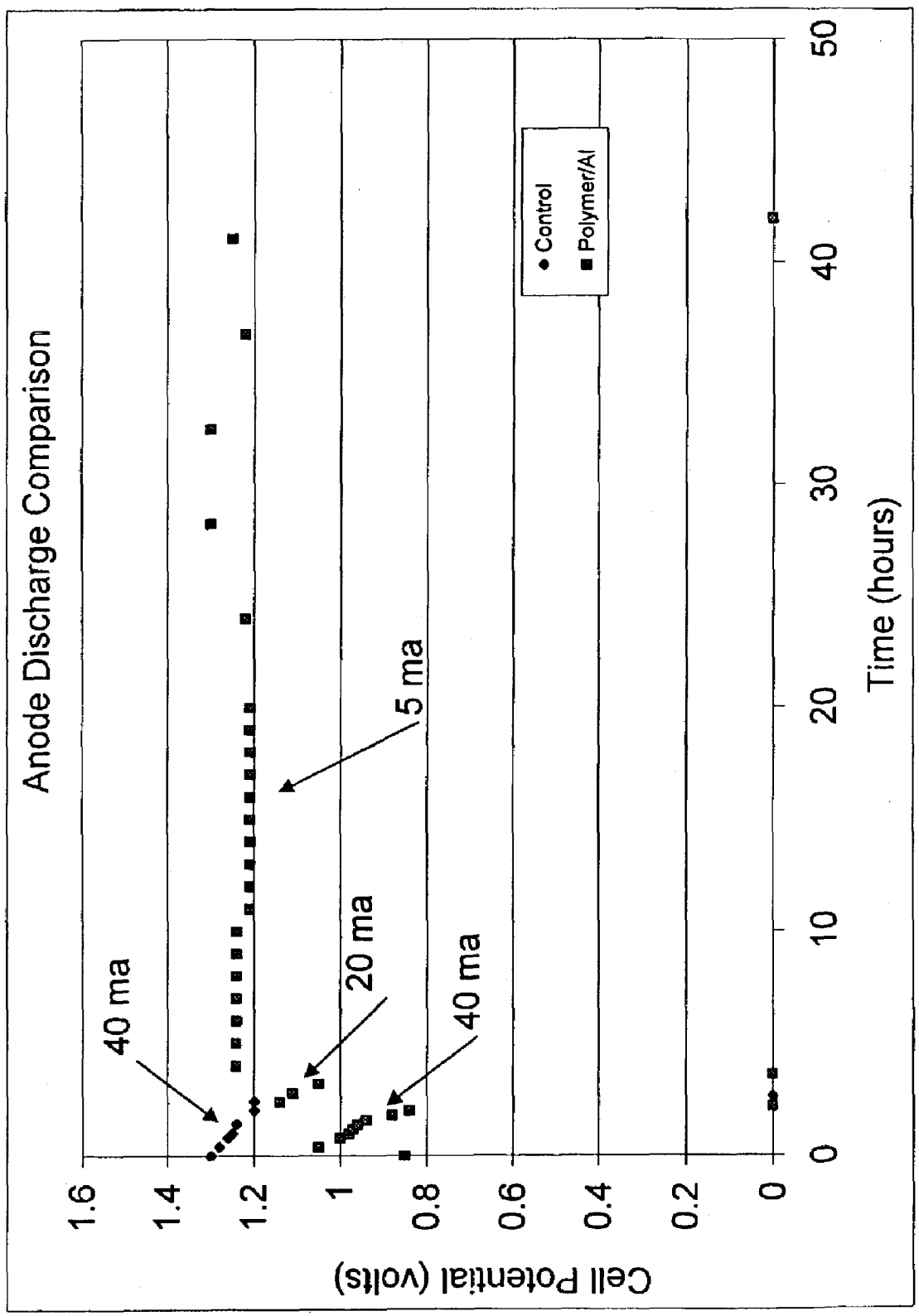
FIG. 6 is a graph comparing cell potential vs. monitoring times for Example 8.

Upon much experimentation it has been found that using approximately 0.5 g of PAA in methanol, 0.5 g of either polystyrene or polymethyl methacrylate in tetrahydrofuran and 3 g aluminum (2 g powder and 1 g substrate) are used. FIG. 6 shows the results of the present formula. The control is an electrode of a thin aluminum sheet. Uniformity of the hydrogel throughout the inert polymer is quite critical in the present invention.

Air cathodes used were metal catalyzed, air-permeable membrane types that exhibited low polarization at the current densities and long operating life. The battery accelerates the production of hydroxyl ions as the permeated air contacts the electrolyte. They are lightweight, as air is used as the active material. Various types of air cathodes are readily available commercially at a reasonable cost. The electrolyte is either a 12 wt % NaCl or 20 wt % KCl water solution.

The individual components of the battery could be carried and the battery could be readily assembled when needed. The components are: the air battery monobody case, numerous anodes cells, cover, and prepared packages of salt or base possibly as a gel. It is expected that the water could be obtainable from the environment; otherwise it would need to be carried. The battery monoblock case can be high impact, compartmental plastic cylinder or prism shaped fitted with the air cathodes on its surface. The number of compartments (cells) would be adjusted to provide the required battery voltage. Normally, three or four cells would be required to match the voltage of a lithium/thionyl chloride cell (3–3.5 volts). The appropriate quantity of the salt/base for the cell electrolyte volume would be packaged with each aluminum anode in a water-soluble material, e.g., gelatin. After the anode(s) are insert, the battery would be filled with water, the cover positioned, the cell would be shaken to dissolve the salt/base in water or even urine to form the electrolyte, thereby activating the battery.

EXAMPLE 9

TABLE 1

Anode Test Characteristics

| Weight | Discharge Rate | Discharge Time | Cell Volts (range) | Capacity (A-Hr) | Capacity (A-Hr/g) | Comment |
|---|---|---|---|---|---|---|
| 0.63 | ~0.63 ma | 13 days | 1.396–1.260 | — | — | Standby test |
| 0.80 | 1 mA/cm$^2$ | 33 hours | 1.115–0.8 | 1.32 | 1.65 | 22° C. |
| 0.76 | 2 mA/cm$^2$ | 10.5 hours | 1.15–0.98 | 0.856 | 1.10 | 22° C. |
| 0.75 | 1 mA/cm$^2$ | 26.2 hours | 1.15–0.90 | 1.05 | 1.40 | 0° C. |
| 0.75 | 1 mA/cm$^2$ | 14.4 hours | 0.5–0.55 | 0.58 | 0.77 | 22° C., Urine |

Al alloy (Mg and Sn) (EB50V) anodes were used. EB50V was obtained from Alupower and now is purchased from Yardney Technical Products Inc., 82 Mechanics, Pawcatuck, Conn. 06379 The electrolyte was NaOH and H$_2$O$_2$ and a carbon counter, typically used when air is not available, e.g., underwater batteries. It was felt that the results would be comparable. All anodes were rolled to a thickness of about 0.05 to 0.075 mm and cut to an area of about 5 cm×7 cm.

EXAMPLE 10

Computation of weight-specific energy densities for successive battery component fabrication is shown about in Table 1.

The above results indicate that the delivered anode capacity would be at least 1.6 A-hr/g at a load of 1 mA/cm$^2$. Using this value, the mass energy densities were calculated. An electrolyte volume of about 1 cc/0.5 A-hr was required for proper cell operation. A cell output of 1 volt would yield 1.6 w-hr/g. The weight of the anode required for a 30 A-hr (or 30 w-hr) cell would be about 20 grams. The air cathode material would be simply composed of layers of carbon sheets doped with catalyst, i.e., Mn, Ag, Co spinel, or Pt, current collector screen and hydrophobic MYLAR® layer, the separator. Its weight would 2 g for a sheet of 5×7 cm.

An empty cell case weight of about 60 g of water, 8 g of salt and 20 g of anode were assumed. The total weight of a cell to produce 30 w-hr would be: (60+60+8+20)/

1000=0.1148 kg. The energy density would be: 30/0.148=203 w-hr/kg. A second 30 w-hr cell would weigh an additional 20 g of anode, 8 g of salt and the water obtained from the environment, the cell case being reused, a total of additional 28 g. The energy density of this cell would be 30 w-hr/0.028 kg=1071 w-hr/kg. This weight would be consistent for each additional cell carried. Thus, if a total of 6 cells were carried, 1 for about every 2 days for a 2 week duration, the overall energy density would be: (203+5[1071])/6=926 w-hr/kg. More than likely a spare cell case or two would be carried. If two spares were carried, the overall energy density would be reduced to (112+5[1071])/6=911 w-hr/kg. The weight would decrease in the course of time and use, i.e., as the anodes are consumed.

If water would need to be carried, the weight computation for the successive cells, the energy density for each would be: (60+20+8)/1000=0.088, 30 w-hr/0.088=340 w-hr/kg. The overall energy density would then be reduced to (203+5[340]/6=317 w-hr/kg. Comparison of this value with the previous value demonstrates that these batteries would be lighter in weight if the water were obtained from the environment.

Figure 7:
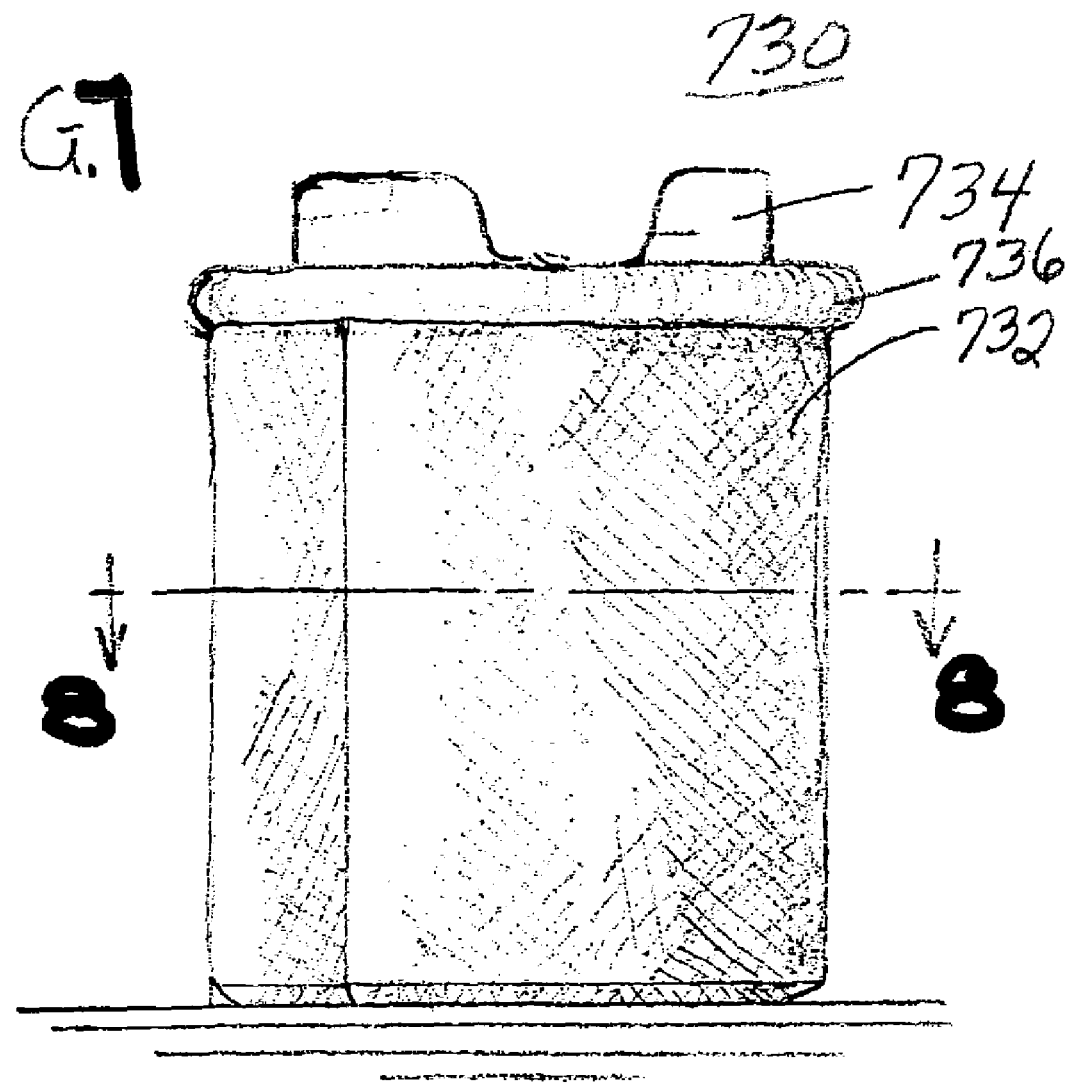
FIG. 7 is a front elevation view of an embodiment of a metal-air battery.

A cylindrical plastic container was fitted with 3 watertight partitions. A rectangular window was cut into the cylindrical wall in each partition, onto which was bonded pieces of air-cathode material, AC51, Yardney Technical Products, Inc., Pawcatuck, Conn. Three pure aluminum (99.9%) sheet anodes ~6×10 cm weighing about 10 g each were inserted, one to each compartment. FIG. 7 is a front view of the metal-air battery 730. The air cathode 732 is exposed on the outside to air and on the inside to the electrolyte. Projecting above the cover 736 is one or more tabs 734 of the anode for connection to the cathode 732 or to the load. FIG. 8 is a top sectional view of the metal-air battery along line 8 in FIG. 7. The battery case 838 contains at least one cell 840 that contains the air cathode 832, the reactive metal composite anode 842, the separator 846 between cells and the electrolyte 844. In order to assemble the metal-air battery, the following components are needed: the case 838 containing the air cathode 732, 832, and cell(s) 840. The reactive metal composite anode 842, water for the electrolyte, particles of either the salt for a neutral or alkaline electrolyte and the cover 736 are possibly individual components to be assembled. Water can be carried or found available in the field. If more than one cell will be found in the metal-air battery than a separator would be part of the assembly. The separator will separate one cell from another cell.

EXAMPLE 11

The cells were fitted with 12 wt NaCl/water solution. Each cell held approximately 125 ml. A load consisting of two small motors was connected to the battery and the potential and current were monitored. The battery operated under continuous load for about 48 hours. The initial potential and current were about 1.2 volts and 0.33 amps, which decreased to 0.7 volts and 0.18 amps at the end of discharge. Using the average potential and current, about 10 amp-hours were drawn from the battery, i.e., about 1 amp-hour/g of anode. The energy delivered was about 10 watt-hours. This example demonstrated that a multi-cell integrated battery delivered a high value of energy capacity with the aluminum-hydrogel-polymer composite anode.

Therefore, what has described above is a method of manufacturing an anode component, which utilizes a reactive metal powder and a two-component electrolyte resistant polymer system and the anode component. In addition, a lightweight, portable group of components for assembling into a battery in situ has been described.

It should therefore readily be understood that many modifications and variations of the present invention are possible with the purview of the claimed inventions. For example, any other suitable reactive metal substrate or mixtures thereof or alloys thereof that requires protection from corrosive alkaline electrolytes and neutral electrolytes in order to slow destruction of the anode; other polymer systems that would allow for both ion and electron transport to the collector and that would hinder anode destruction.

What is claimed is:

1. An anode for use in a primary metal-air battery having an alkaline or neutral salt electrolyte, said anode comprising:
   a low molecular weight reactive metal substrate;
   a low molecular weight reactive metal powder; and
   at least a two-component electrolyte resistant polymer system;
   wherein a first component is an ionic conductive linearized hydrogel,
   wherein a second component is an inert structural polymer matrix,
   wherein said reactive metal powder and said first component are dispersed within said second component to form a material wherein said first component is uniformly dispersed,
   wherein said reactive metal powder comprises Al
   said material coats said substrate, and
   wherein said reactive metal is aluminum, and
   wherein said reactive metal powder has a weight % of from about 15 wt % to about 95.5 wt % of the material.

2. The anode according to claim 1,
   wherein said hydrogel is a linear polymer, and
   wherein said hydrogel has a weight % of from about 1.0 wt % to about 45 wt % of said material.

3. The anode according to claim 2, wherein said hydrogel is polyacrylic acid.

4. The anode according to claim 3, wherein said hydrogel is a mixture of molecular weights of polyacrylic acid.

5. The anode according to claim 1, wherein said hydrogel is selected from the group consisting of synthesized or man-made long chain polymeric hydrogels.

6. The anode according to claim 1, wherein said inert structural polymer matrix is a thermoplastic.

7. The anode according to claim 1, wherein said inert structural polymer matrix is selected from the group consisting of polystyrene, polyethylene, polypropylene, polyvinylidene chloride, polymethyl methacrylate, copolymers thereof and mixtures thereof, and
   wherein said inert structural polymer has a weight % of from about 3.5 wt % to about 75 wt % of said material.

8. The anode according to claim 7, wherein said inert structural polymer matrix is polystyrene.

9. The anode according to claim 1, wherein said hydrogel is of from about 4 to about 6% by weight percent polyacrylic acid,
   wherein said polymer is of from about 4 to about 6% by weight polystyrene or polymethyl methacrylate, and
   wherein said powder is of from about 88 to about 92% aluminum or aluminum alloy.

10. A primary battery anode for use in a primary metal-air battery having an alkaline or neutral salt electrolyte, said anode comprising:
    aluminum and/or an aluminum alloy substrate;
    aluminum and/or an aluminum alloy powder;
    linearized polyacrylic acid; and
    polystyrene or polymethyl methacrylate; and wherein said powder and said polyacrylic acid are dispersed within said polystyrene or polymethyl methacrylate to form a material, wherein said polyacrylic acid is uniformly dispersed, and wherein said material coats said substrate.

11. A primary metal-air battery containing a lightweight, portable, environmentally friendly aluminum hydrogel/inert nonporous polymer anode, said battery comprising:

an air cathode;

KOH or NaOH or NaCl or KCl electrolyte; and an aluminum composite anode;

wherein said anode composite comprises:

aluminum or aluminum alloy substrate;

aluminum or aluminum alloy powder; and at least a two-component electrolyte resistant polymer system;

wherein a first component is an ion conducting linearized hydrogel comprising polyacrylic acid, wherein a second component is an inert structural polymer matrix comprising polystyrene or polymethyl methacrylate, wherein said aluminum or aluminum alloy powder and said first component are dispersed within said second component to form a material, wherein said first component is uniformly dispersed, and wherein said material coats said aluminum or aluminum alloy substrate to form an aluminum anode composite.

* * * * *